United States Patent Office 3,767,682
Patented Oct. 23, 1973

3,767,682
DYESTUFFS
Edwin Dennis Harvey, Manchester, England, assignor to Imperial Chemical Industries Limited, London, England
No Drawing. Filed Sept. 24, 1971, Ser. No. 183,640
Int. Cl. C09b 1/50
U.S. Cl. 260—379
1 Claim

ABSTRACT OF THE DISCLOSURE

The disperse anthraquinone dyestuffs, free from sulphonic acid groups, which are of the formula:

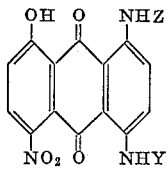

wherein Z is a hydrogen atom or an optionally substituted alkyl radical, and Y is an aryl radical which may carry substituents, a process for the manufacture of the said dyestuffs, and the use of the said dyestuffs for colouring synthetic textile materials.

---

This invention relates to disperse anthraquinone dyestuffs which are valuable for colouring synthetic textile materials.

According to the invention there are provided the disperse anthraquinone dyestuffs, free from sulphonic acid groups, which are of the formula:

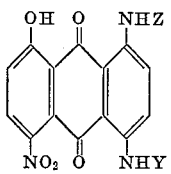  FORMULA I wherein Z is a hydrogen atom or an optionally substituted alkyl radical; and Y is an aryl radical which may carry substituents.

The optionally substituted alkyl radicals represented by Z are preferably optionally substituted lower alkyl radicals; and as specific examples of such radicals there may be mentioned lower alkyl such as methyl, ethyl, n-propyl, iso-propyl, n-butyl, isobutyl, sec-butyl, tertiary butyl, n-hexyl, n-pentyl and 1:5-dimethyl-n-hexyl, hydroxy lower alkyl such as β-hydroxyethyl, β:γ-dihydroxypropyl, β- and γ-hydroxy-n-propyl and γ-hydroxy-n-butyl, lower alkoxy lower alkyl such as β-(methoxy or ethoxy)ethyl and γ-(methoxy, ethoxy or propoxy)propyl, lower alkyl carbonyloxy lower alkyl such as acetoxyethyl, cyano lower alkyl such as β-cyanoethyl, carbo lower alkoxy lower alkyl such as β-carboethoxyethyl, and phenyl lower alkyl such as benzyl and β-phenylethyl.

The aryl radical represented by Y is preferably the phenyl radical which may carry substituents, for example lower alkyl such as methyl, lower alkoxy, such as methoxy chlorine, bromine, hydroxy, carboxy, carbolower alkoxy, cyano, carbonamido, amino, N-lower alkylamino, N:N-di(loweralkyl)amino, carboxymethyl and lower alkyl esters thereof, and hydroxy lower alkyl such as β-hydroxyethyl.

Throughout this specification the terms lower alkyl and lower alkoxy are used to denote alkyl and alkoxy radicals respectively containing from 1 to 6 carbon atoms.

According to a further feature of the invention there is provided a process for the manufacture of the anthraquinone dyestuffs of the invention which comprises reacting an anthraquinone compound of the formula:

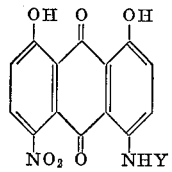  (Formula II)

with an amine of the formula $ZNH_2$ in the presence of boric acid or a derivative thereof, wherein Y and Z have the meanings stated above and the amine and anthraquinone compound are free from sulphonic acid groups.

The process of the invention can be conveniently carried out by stirring the anthraquinone compound of Formula II, the boric acid or derivative thereof, and the amine together, preferably at a temperature between 50° C. and the boiling point of the reaction mixture, and for a time which is normally in the region of from 15 minutes to 30 hours. The course of the reaction can, if desired, be followed by withdrawing samples of the reaction mixture and subjecting them to thin layer chromatography, the reaction being terminated when the required product has been obtained. The resulting dyestuff can then be isolated by conventional methods, for example by siding an organic liquid, such as methanol or ethanol, in which the dyestuff is insoluble and filtering off the precipitated dyestuff.

When using ammonia in the process, then it is preferred to pass a stream of ammonia through a solution of the anthraquinone compound of Formula II in an organic solvent which also contains the boric acid or derivative thereof.

In carrying out the reaction it is necessary to use at least one mol of the amine for each mol of the said anthraquinone compound. In general it is unnecessary to use more than 3 mols of the amine for each mol of the said anthraquinone compound.

If desired mixture of the said anthraquinone compounds of Formula II can be used in the process of the invention in which event there is obtained a mixture of the corresponding dyestuffs of Formula I.

In order also that the reaction mixture is sufficiently fluid it is usually found necessary to additionally use an organic solvent, which if desired can be an excess of the amine, although it is preferred to use phenolic compounds, such as phenol or o-cresol, as the solvent.

As examples of derivatives of boric acid there may be mentioned compounds of the formula $(VO)_3B$ wherein V is alkyl or aryl; and as specific examples of such compounds there may be mentioned tri-n-propylborate, tri-n-butylborate, tri-n-phenylborate, tri-p-methylphenylborate and tri-p-chlorophenylborate. It is preferred to use between one and three mols of boric acid or derivative thereof for each mol of the anthraquinone compound.

The anthraquinone compounds of Formula II can themselves be obtained by condensing an amine of the formula $YTH_2$, wherein Y has the meaning stated, with 4:5-dinitro-1:8-dihydroxyanthraquinone optionally in the presence of an organic solvent.

As specific examples of amines of the formula $ZNH_2$ which can be used in the process there may be mentioned ammonia, methylamine, ethylamine, n-propylamine, iso-propylamine, n-butylamine, iso-butylamine, sec-butylamine, tertiarybutylamine, 1:5-dimethyl - n - hexylamine, n-hexylamine, n-heptylamine, n-pentylamine, β-hydroxyethylamine, β- or γ-hydroxy-n-propylamine, β-methoxyisopropylamine, benzylamine and β-phenylethylamine.

The anthraquinone dyestuffs of the invention are valuable for colouring synthetic textile materials, for example cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn or woven or knitted fabric.

Such textile materials can conveniently be coloured with the said anthraquinone dyestuffs by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60 and 85° C.; in the case of cellulose triacetate or polyamide textile materials it is preferred to carry out the dyeing process at 95° to 100° C.; in the case of aromatic polyester textile materials the dyeing process can either be carried out at a temperature between 90 and 100° C. preferably in the presence of a carrier such as diphenyl or o-hydroxydiphenyl, or at a temperature above 100° C., preferably at a temperature between 120° and 140° C., under superatmospheric pressure.

Alternatively the aqueous dispersion of the said anthraquinone dyestuffs can be applied to the textile material by a padding or printing process, followed by heating or steaming of the textile material. In such processes it is preferred to incorporate a thickening agent, such as gum tragacanth, gum arabic, or sodium alginate, into the aqueous dispersion of the said anthraquinone dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile materials to a treatment in an alkaline aqueous solution of sodium hydrosulphite before the soaping treatment in order to remove loosely attached dyestuff from the surface of the textile material.

The anthraquinone dyestuffs of the invention can also be applied by solvent dyeing methods or used for the mass colouration of synthetic polymers which are subsequently converted into the form of textile materials.

The anthraquinone dyestuffs have excellent affinity and building up properties on synthetic textile materials, and in particular on aromatic polyester textile materials, so enabling heavy depths of shade to be obtained. The resulting colourations have excellent fastness to light, to wet treatments, and, in particular to dry heat treatments such as those carried out at high temperatures during pleating operations.

The anthraquinone dyestuffs are also valuable for colouring cellulose acetate textile materials as the resulting colourations have excellent fastness to gas fumes.

A preferred class of the anthraquinone dyestuffs comprises the dyestuffs wherein Z represents a hydrogen atom and Y is a phenyl radical which may carry substituents.

If desired the anthraquonone dyestuffs of the invention can be applied to synthetic textile materials in conjunction with other disperse dyes, such as are described in, for example, British specifications Nos. 806,271, 835,819, 840,903, 847,175, 852,306, 852,493, 859,899, 865,328, 872,204, 894,012, 908,656, 909,843, 910,306, 913,856, 919,424, 944,513, 944,722, 953,887, 959,816, 960,235 and 961,412.

The invention is illustrated but not limited by the following examples in which the parts and percentages are by weight:

EXAMPLE 1

A mixture of 5.0 parts of 4-(p-chloroanilino)-5-nitro-1:8-dihydroxyanthraquinone and 50 parts of phenol is stirred at 120° C., 1.2 parts of boric acid are added, and a stream of ammonia is bubbled through the mixture until chromatography indicates that the reaction is complete. The mixture is then cooled to 60° C., 50 parts of methanol and 25 parts of water are added, and the mixture is stirred fo several hours at 20° C.

The precipitated dyestuff consisting essentially of 1-amino - 4 - (p-chloroanilino) - 5-nitro-8-hydroxanthraquinone is then filtered off, washed with methanol and dried.

When dispersed in aqueous medium the dyestuff dyes polyethylene terephthalate textile materials in greenish blue shades of excellent fastness properties.

The 4 - (p-chloroanilino) - 5-nitro-1:8-dihydroxyanthraquinone was itself obtained by condensing p-chloroaniline with 4:5-dinitro-1:8-dihydroxyanthraquinone.

EXAMPLE 2

A mixture of 20 parts of phenol and 2.32 parts of boric acid is stirred for 2 hours at 130° C., the water formed being distilled off from the reaction medium. The mixture is cooled to 100° C., 3.76 parts of 4-anilino-5-nitro-1:8-dihydroxyanthraquinone and 0.875 part of sec-butylamine are then added, and the resulting mixture is stirred for 2 hours at 130° C. The mixture is cooled to 60° C., 20 parts of methanol and 5 parts of water are added, and the precipitated solid is filtered off, washed with methanol and dried.

The product consists essentially of 1-sec-butylamino-4-anilino-5-nitro-8-hydroxyanthraquinone.

When dispersed in aqueous medium the dyestuff dyes polyethylene terephthalate textile materials in bright bluish-green shades of excellent fastness properties.

In place of the 0.875 part of sec-butylamine used in Example 2 there are used the equivalent amounts of ethyl amine, n-butylamine, γ-methoxypropylamine, n-hexylamine, benzylamine, iso-propylamine or β-hydroxyethylamine whereby the corresponding bluish-green dyestuffs are obtained having the appropriate amino group in the 1-position of the anthraquinone nucleus instead of the sec-butylamino group.

EXAMPLE 3

In place of the 3.76 parts of the 4-anilino-5-nitro-1:8-dihydroxyanthraquinone used in Example 2 there are used the corresponding amounts of
(a) a mixture of equimolecular parts of 4-(o-anisidino)-5-nitro - 1:8 - dihydroxyanthraquinone and 4-(p-anisidino)-5-nitro-1:8-dihydroxyanthraquinone,
(b) a mixture of equimolecular parts of 4-(o-toluidino)-5-nitro - 1:8 - dihydroxyanthraquinone and 4-(p-toluidino)-5-nitro-1:8-dihydroxyanthraquinone, and
(c) a mixture of equimolecular parts of 4-anilino-5-nitro-1:8-dihydroxyanthraquinone and 4-(p-toluidino)-5-nitro-1:8-dihydroxyanthraquinone whereby the corresponding mixtures are obtained having the hydroxy group in the 1- position of the anthraquinone nucleus replaced by the sec-butylamino group.

When dispersed in aqueous medium, these three dyestuff mixtures gave bright bluish-green, bluish-green and green shades respectively when applied to an aromatic polyester textile material.

EXAMPLE 4

In place of the 3.76 parts of the 4-anilino-5-nitro-1:8-dihydroxyanthraquinone used in Example 2 there are used the equivalent amounts of (a) 4-(o-toluidino)-5-nitro-1:8-dihydroxyanthraquinone,
(b) 4-(m-toluidono)-5-nitro-1:8-dihydroxyanthraquinone,
(c) 4-(p-toluidino)-5-nitro-1:8-dihydroxyanthraquinone,
(d) 4-(2′:4′-dimethylanilino)-5-nitro-1:8-dihydroxyanthraquinone,
(e) 4-(p-chloroanilino)-5-nitro-1:8-dihydroxyanthraquinone,
(f) 4-(o-anisidino)-5-nitro-1:8-dihydroxyanthraquinone, (g) 4-(p-anisidino)-5-nitro-1:8-dihydroxyanthraquinone, and
(h) 4-(p-β-hydroxyethylanilino)-5-nitro-1:8-dihydroxyanthraquinone whereby the corresponding dyestuffs are obtained having the hydroxy group in the 1- position of the anthraquinone nucleus replaced by the sec-butylamino group.

All these dyestuffs when dispersed in aqueous medium gave bluish-green shades of excellent fastness properties when applied to a polyester textile material.

I claim:
1. A disperse anthraquinone dyestuff of the formula:

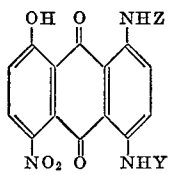

wherein

Z is selected from the class consisting of lower alkyl, hydroxy, lower alkyl, lower alkoxy lower alkyl and phenyl lower alkyl;
and Y is selected from the class consisting of phenyl and phenyl substituted by a member selected from the class consisting of lower alkyl, lower alkoxy, chlorine and hydroxy lower alkyl.

References Cited
UNITED STATES PATENTS

| 3,444,215 | 5/1969 | Gehrke | 260—380 |
| 3,647,828 | 3/1972 | Spietschka et al. | 260—380 |

FOREIGN PATENTS

| 535,535 | 1/1957 | Canada | 260—380 |
| 7010098 | 1/1971 | Netherlands | 260—380 |

JAMES A. PATTEN, Primary Examiner

R. GERSTL, Assistant Examiner

U.S. Cl. X.R.
8—39.40; 260—380